United States Patent [19]
Komatsu

[11] Patent Number: 5,657,306
[45] Date of Patent: Aug. 12, 1997

[54] OPTICAL PICK-UP HEAD HAVING POLARIZING BEAM SPLITTER

[75] Inventor: Hisanobu Komatsu, Hachioji, Japan

[73] Assignee: Olympus Optical Co., Ltd., Tokyo, Japan

[21] Appl. No.: 329,845

[22] Filed: Oct. 27, 1994

[30] Foreign Application Priority Data

Oct. 27, 1993 [JP] Japan .................. 5-268925

[51] Int. Cl.$^6$ ......................................... G11B 7/00
[52] U.S. Cl. ................................. 369/112; 369/110
[58] Field of Search .......................... 369/110, 109, 369/112, 44.23, 44.24, 44.14

[56] References Cited

U.S. PATENT DOCUMENTS

| | | | |
|---|---|---|---|
| 4,863,246 | 9/1989 | Anthon | 369/110 |
| 5,085,496 | 2/1992 | Yoshida et al. | 369/110 |
| 5,189,651 | 2/1993 | Utsumi | 369/110 |
| 5,272,685 | 12/1993 | Ando et al. | 369/110 |
| 5,337,300 | 8/1994 | Takishima et al. | 369/110 |
| 5,392,274 | 2/1995 | Sofue | 369/44.23 |
| 5,404,490 | 4/1995 | Matsubayashi et al. | 369/110 |
| 5,422,866 | 6/1995 | Yamaguchi et al. | 369/112 |
| 5,438,562 | 8/1995 | Kobayashi et al. | 369/44.23 |
| 5,444,677 | 8/1995 | Hosokawa et al. | 369/112 |
| 5,467,336 | 11/1995 | Ando et al. | 369/112 |

FOREIGN PATENT DOCUMENTS

| | | | |
|---|---|---|---|
| 2118936 | 5/1990 | Japan . | |
| 3252928 | 11/1991 | Japan . | |
| 3-254448 | 11/1991 | Japan | 369/110 |

Primary Examiner—Nabil Hindi
Attorney, Agent, or Firm—Watson Cole Stevens Davis P.L.L.C.

[57] ABSTRACT

An optical pick-up head for reading information recorded on an opto-magnetic record medium including a laser light source emitting a linearly polarized beam, a beam splitter for transmitting a part of the laser beam, and an objective lens for projecting the laser beam transmitted through the beam splitter onto the record medium. A return laser beam reflected by the record medium is collected by the objective lens and is made incident upon the beam splitter. A part of the return laser beam is reflected by the beam splitter and is made incident upon a converging lens. A converged laser beam emanating from the converging lens is made incident upon a polarizing beam splitter which is formed by a single optical body such as plate or prism and has a polarizing plane applied on a surface of the optical body. The converged laser beam is made incident upon the polarizing plane at an incident angle or refraction angle of 70°±10°. Then, the laser beam is separated into P- and S-polarized beams which are received by respective light receiving elements. The information is reproduced by deriving a difference between outputs of these light receiving elements.

7 Claims, 6 Drawing Sheets

FIG_1
PRIOR ART

FIG_2
PRIOR ART

FIG_3

FIG_4

FIG_5

FIG_7

OPTICAL PICK-UP HEAD HAVING POLARIZING BEAM SPLITTER

BACKGROUND OF THE INVENTION

1. Field of the Invention

The present invention relates to an optical pick-up head for reading information recorded in an optical record medium such as an opto-magnetic record medium comprising a light source for emitting an incident light beam, a beam splitter for directing the incident light beam emitted by said light source onto an optical record medium and for directing a return light beam reflected by said optical record medium in a direction which is different from a direction directing the light source, a focusing lens for focusing the return light beam emanating from said beam splitter into a converged light flux, a polarizing beam splitter arranged in said converged light flux for separating said converged light beam into P-polarized light beam and S-polarized light beam, and a photodetector including first and second light receiving elements for receiving said P-polarized light beam and S-polarized light beam, respectively.

2. Description of the Prior Art

There have been proposed various kinds of optical pick-up heads. In particular, an optical pick-up head for use in an opto-magnetic disk has been disclosed in Japanese Patent Application Laid-open Publication Kokai Hei 2-118936, in which a linearly polarized light beam reflected from the opto-magnetic disk is made incident upon a polarizing beam splitter and is divided thereby into P-polarized beam and S-polarized beam, then the P- and S-polarized beams are separately received by light receiving elements of a photodetector, and a difference between outputs of these light receiving elements is derived as a reproduced signal. It should be noted that the P-polarized beam is a polarized beam whose polarizing direction is parallel with an incident plane and the S-polarized beam is a polarized beam whose polarizing direction is perpendicular to the incident plane, so that the polarizing directions of these polarized beams are perpendicular to each other.

Figure 1:
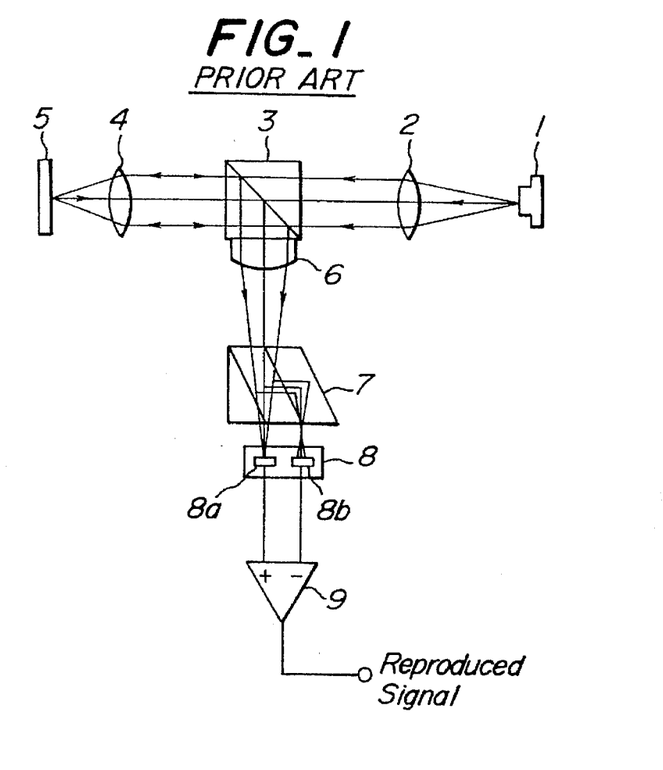
FIG. 1 shows an optical pick-up head according to the prior art.

FIG. 1 is a schematic view showing a general construction of the known optical pick-up head disclosed in the above mentioned Kokai Hei 2-118936. A linearly polarized beam emitted by a laser light source 1 is converted into a parallel laser beam by means of a collimator lens 2 and is made incident upon a beam splitter 3. A laser beam transmitted through the beam splitter 3 is made incident upon an objective lens 4 and then is made incident upon an opto-magnetic record medium 5 as a very fine spot. A return laser beam reflected by the opto-magnetic record medium 5 is made incident upon the beam splitter 3 by means of the objective lens 4. The return laser beam reflected by the beam splitter 3 is then focused by a converging lens 6 and is made incident upon a polarizing beam splitter 7, and is divided into P-polarized beam and S-polarized beam. As is well known in the art, the polarizing direction of the linearly polarized laser beam projected onto the opto-magnetic record medium 5 is rotated in accordance with content of the information recorded on the record medium, so that intensities of the P-polarized and S-polarized beams are changed in accordance with the content of the information. These P- and S-polarized beams are separately received by light receiving elements 8a and 8b of a photodetector 8. Then, output signals from these light receiving elements 8a and 8b are supplied to differential amplifier 9 to derive a difference therebetween. An output signal of the differential amplifier 9 represents a difference in intensity between the P- and S-polarized beams. In this manner, the information recorded on the opto-magnetic record medium 5 can be reproduced by suitably processing the output signal of the differential amplifier 9.

Figure 2:
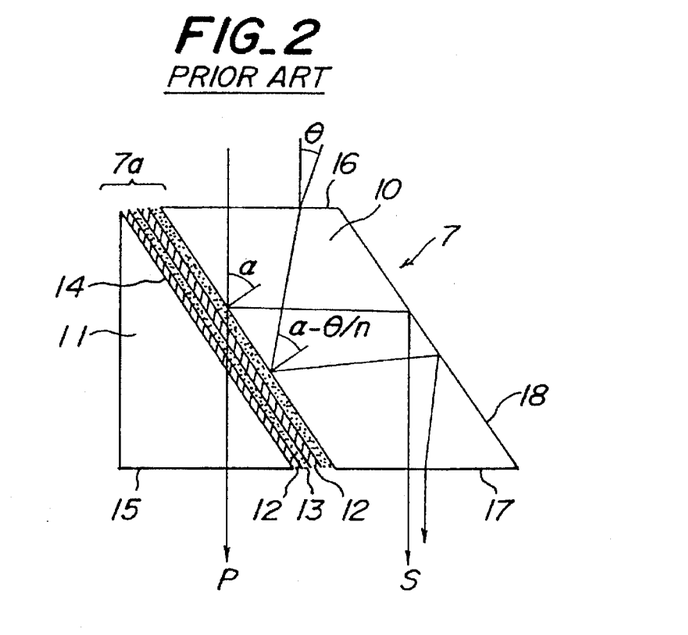
FIG. 2 shows a polarizing beam splitter used in the optical pick-up head of FIG. 1.

FIG. 2 is a schematic view illustrating the detailed construction of the polarizing beam splitter 7 shown in FIG. 1. The polarizing beam splitter 7 comprises two prisms 10 and 11 which are cemented to each other by means of a suitable adhesive while a polarizing plane 7a is interposed therebetween. The polarizing plane 7a is formed by stacking a number of thin films 12 and 13 having higher and lower refractive indices alternately. In the known optical pick-up head shown in FIG. 1, the polarizing beam splitter 7 illustrated in FIG. 2 is arranged to be rotated by 45° with respect to the polarizing direction of the converged light beam, so that the P-polarized beam transmits the polarizing plane and the S-polarized beam is reflected by the polarizing plane. In this manner, the P- and S-polarized light beams can be separated from each other.

It should be noted that on a surface 14 of the prism 11 is applied the polarizing coating which has a small dependency upon an incident angle, so that off-axis light rays of the converged light beam emanating from the single converging lens 6 are similarly separated into the P- and S-polarized beams. An outermost light ray is deviated from the optical axis by an angle θ and is made incident upon the polarizing plane 7a at an incident angle of $\alpha-\theta/n$, wherein $\alpha$ is an incident angle of an on-axis ray and n is a refractive index of the prism 10. A deviation of the incident angle of the outermost light ray with respect to that of the on-axis light ray amounts usually 3°.

As shown in FIG. 2, the known polarizing beam splitter 7 is formed by two prisms 10 and 11, and the polarizing plane 7a is provided between the interface between these prisms. The polarizing coating is applied on the plane 14 of the prism 11, and on a surface 15 of the prism from which the P-polarized beam emanates there is applied an anti-reflection coating. On incident and exit surfaces 16 and 17 of the other prism 10 there are applied anti-reflection coatings, and on a side surface 18 there is applied a protection coating. Further, the two prisms 10 and 11 are cemented with each other by means of a cementing agent. Therefore, when the known polarizing beam splitter 7 is manufactured, after applying the required coatings on the above mentioned five surfaces of the prisms 10 and 11 and forming the polarizing plane 7a on the surface 14, these prisms are cemented. This results in that the manufacturing process is rather complicated and the cost of the polarizing beam splitter is liable to be increased. The manufacturing cost would be further increased due to the fact that the known polarizing beam splitter 7 requires the two prisms, i.e. parallelogram prism 10 and triangular prism 11, so that the polarizing beam splitter is liable to be further expensive.

Moreover, when the thin film 12 having a high refractive index is made of $TiO_2$, the $TiO_2$ film reacts with the cementing agent, and a light absorption occurs due to a chemical reaction. Therefore, even if a transmissivity of the P-polarized beam is designed to be 100%, in practice the transmissivity is decreased lower than 95%. In this manner, the known polarizing beam splitter suffers from a loss in an amount of information light.

SUMMARY OF THE INVENTION

The present invention has for its object to provide a novel and useful optical pick-up head, in which the polarizing beam splitter can be simply manufactured at a low cost and the loss of the information light due to the absorption of light can be avoided.

According to the invention, an optical pick-up head comprising a light source for emitting a light beam, a beam splitter for introducing the light beam emitted by the light source onto an optical record medium having information recorded thereon and directing a reflected light beam reflected by the optical record medium in a direction which differs from a direction in which the light beam emitted by the light source is made incident upon the beam splitter, a converging lens for converging the reflected light beam emanating from said beam splitter into a converged light beam, a polarizing beam splitter arranged within said converged light beam for separating said converged light beam into P-polarized beam and S-polarized beam, and a photodetector for receiving said P-polarized and S-polarized beams separately from each other, the improvement being characterized in that said polarizing beam splitter is formed by a single optical body such as prism and plate having a surface on which a polarizing plane is formed, and the converged light beam emanating from the converging lens is made incident upon the polarizing beam splitter such that an on-axis light ray of the converged light beam is made incident upon said polarizing plane at an incident angle of 70°±10° or, is refracted by said polarizing plane at a refraction angle of 70°±10°.

According to the invention, in order to reduce a manufacturing cost of the polarizing beam splitter, use is made of the surface type polarizing beam splitter in which the polarizing plane is formed on a surface. It has been known from Japanese Patent Application Laid-open Publication Kokai Hei 3-252928 to use the plate type polarizing beam splitter in the optical pick-up head. In this known optical pick-up head, an S-polarized laser beam emitted from a light source is made incident upon a surface of a polarizing beam splitter plate and is reflected toward an optical record medium. The thus reflected laser beam is transmitted through a quarter wavelength plate and is made incident upon the record medium by means of an objective lens. The laser beam is reflected by the record medium and is collected by the objective lens and is transmitted through the quarter wavelength plate. The laser beam has passed through the quarter wavelength plate twice, so that its polarizing direction is rotated by 90°. Therefore, a P-polarized beam is made incident upon the polarizing plane of the plate type polarizing beam splitter. Now the P-polarized beam is refracted by the polarizing plane into a direction which is different from a direction of the light source. In this manner, the incident S-polarized beam and the return P-polarized beam can be separated from each other.

In such a plate type polarizing beam splitter, incident angle dependency and wavelength dependency of the polarizing plane are rather large. Therefore, if an incident angle of the outermost light ray upon the polarizing plane or a refraction angle by the polarizing plane deviates by ±3° from that of the on-axis light ray or a wavelength of the light beam changes slightly, the transmissivity for the P-polarized beam and the reflectance for the S-polarized beam might be decreased lower than 90%. In the present invention, by setting the incident angle or refraction angle to 70°±10°, the incident angle dependency and wavelength dependency can be improved, and thus the transmissivity of more than 90% for the P-polarized beam and the reflectance more than 90% for the S-polarized beam can always be attained for all light rays including an outermost light ray which deviates from the on-axis light ray by ±3° or the wavelength of the light beam changes by 20 nm. Now the reason of this will be explained with reference to a graph showing a wavelength width which satisfies both the transmissivity and reflectance of more than 90%.

BRIEF DESCRIPTION OF THE DRAWINGS

The invention will now be set forth in detail with reference to the drawings, in which.

DETAILED DESCRIPTION OF THE PREFERRED EMBODIMENT

Figure 3:
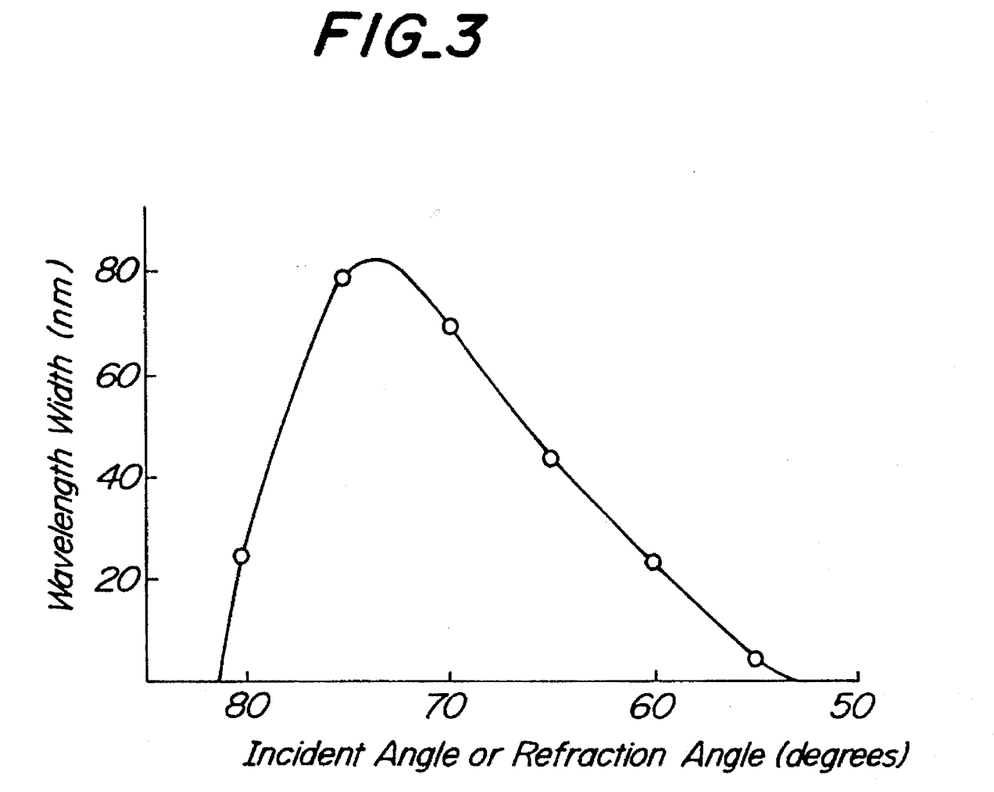
FIG. 3 shows a wavelength width as a function of an incident angle or refraction angle according to the present invention.

In FIG. 3, a horizontal axis denotes an incident angle or refraction angle of an on-axis light ray, and a vertical axis represents a wavelength width which satisfies both the transmissivity of more than 90% for the P-polarized beam and the reflectance of more than 90% for the S-polarized beam when the incident angle or refraction angle changes by ±3°. For instance, when the incident angle is changed in a range of 55°±3°, the wavelength width for satisfying the above condition is very small such as 5 nm. The wavelength width is gradually increased in accordance with the increase in the incident angle or refraction angle, and when the incident angle is set to a value within a range of 70°±10°, it is possible to obtain a very wide wavelength width of more than 20 nm. This means that when an on-axis light ray of the converged light beam is made incident upon the polarizing plane at an incident angle of 70°±10°, even though the wavelength is changed by 20 nm, it is still possible to obtain the transmissivity and reflectance of more than 90%. By taking into account of possible manufacturing error and proof tests, the permissible wavelength width of more than 20 nm is sufficient for obtaining the desired transmissivity of more than 90% for the P-polarized beam and the reflectance of more than 90% for the S-polarized beam although the incident angle or refraction angle deviates by ±3° with respect to that of the on-axis light ray.

The above mentioned condition of the transmissivity of more than 90% and the reflectance of more than 90% has been calculated from a permissible reduction of C/N. The reduction of C/N can be calculated as follows.

$$C/N \propto \{(T_P+R_S)-(R_P+T_S)\}/(T_P+R_S+R_P+T_S)^{1/2}$$

wherein $T_P$ and $T_S$ are transmissivities for the P- and S-polarized beams, respectively, and $R_S$ and $R_P$ are reflectances for the S- and P-polarized beams, respectively. It can be understood from this equation that if the transmissivity for the P-polarized beam and the reflectance for the S-polarized beam are higher than 90%, the decreasing amount in C/N can be suppressed to 1.9 dB as compared with an ideal case in which both the transmissivity and reflectance can be set to 100%. This reduction of 1.9 dB is sufficient for actual applications of the optical pick-up head.

Figure 4:
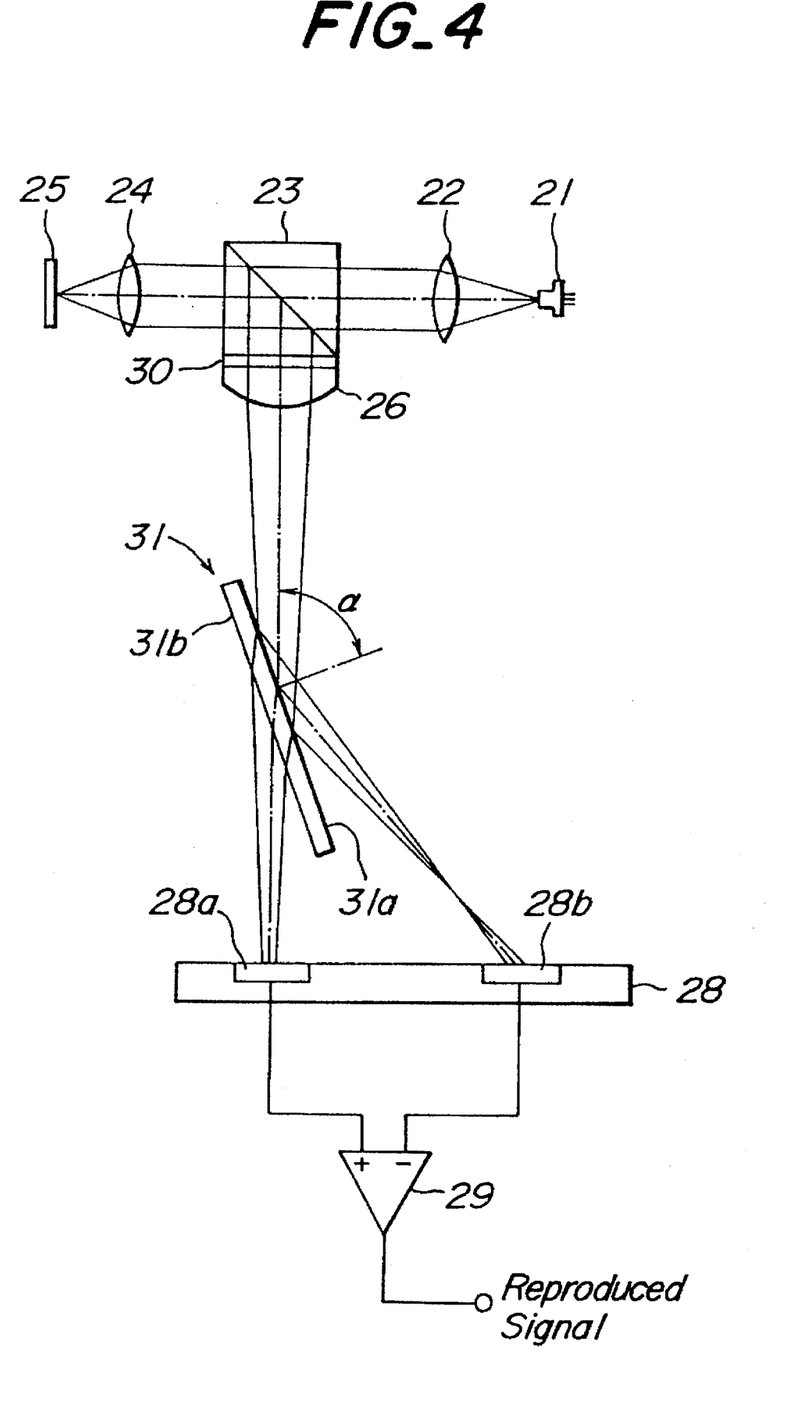
FIG. 4 shows a first embodiment of an optical pick-up head according to the present invention.

FIG. 4 is a schematic view showing an embodiment of the optical pick-up head according to the invention. In the present embodiment, the polarizing beam splitter 31 is formed by a parallelogram plate and on its front surface 31a is applied a polarizing plane formed by multicoating. The multicoating is formed by a stack of the following thin films; $Al_2O_3$ (293 nm), $TiO_2$ (135 nm), $SiO_2$ (137 nm), $TiO_2$ (78 nm), $SiO_2$ (137 nm), $TiO_2$ (78 nm), $SiO_2$ (137 nm), $TiO_2$ (78 nm), $SiO_2$ (137 nm), $TiO_2$ (78 nm), $SiO_2$ (137 nm), $TiO_2$ (78 nm), $SiO_2$ (137 nm), $TiO_2$ (78 nm), $SiO_2$ (137 nm), $Al_2O_3$ (293 nm), $SiO_2$ (137 nm) and $TiO_2$ (78 nm). It should be noted that figures in blankets denote thicknesses of the films. On a rear surface 31b of the parallelogram plate 31 there is applied an anti-reflection coating.

A linearly polarized laser beam emitted by a laser light source 21 is converted by a collimator lens 22 into a parallel beam and is made incident upon an opto-magnetic record medium 25 as a spot by means of beam splitter 23 and objective lens 24. The laser beam reflected by the opto-magnetic record medium 25 is focused by the objective lens 24 into a parallel laser beam and is made incident upon the beam splitter 23. A part of the laser beam is reflected by the beam splitter 23 and is made incident upon a half wavelength plate 30, so that a polarizing direction is rotated by 45°. The laser beam is focused by a converging lens 26 formed by a single lens and a thus converged laser beam is made incident upon the polarizing beam splitter 31 at such an incident angle that an on-axis laser ray is made incident upon the polarizing plane of the polarizing beam splitter at an incident angle $\alpha$ of 70°. Then, the incident laser beam is separated into a P-polarized transmission beam and an S-polarized reflection beam. The beam splitter 23, half wavelength plate 30 and converging lens 26 are formed as a single optical unit.

The P-polarized laser beam transmitted through the polarizing multicoating is transmitted through the anti-reflection coating applied on the rear surface 31b and is made incident upon a first light receiving element 28a of a photodetector 28. The S-polarized laser beam reflected by the polarizing multicoating is made incident upon a second light receiving element 28b of the photodetector 28. Output signals of the light receiving elements 28a and 28b are supplied to a differential amplifier 29, and a difference therebetween is derived. This difference represents information stored on the opto-magnetic record medium 25. In this manner, the information can be reproduced from the opto-magnetic record medium 25.

In the present embodiment, a focusing error is derived by a so-called beam size method. To this end, the first and second light receiving elements 28a and 28b are arranged before and after a focal point of the converging lens 26. A tracking error is obtained by a so-called push-pull method.

As stated above, in the present embodiment, the polarizing beam splitter 31 is formed by a parallelogram plate, and thus the cost of the optical pick-up head can be reduced. Further, the laser beam is made incident upon the polarizing beam splitter at an incident angle $\alpha$ of about 70°, so that an excellent spectrum property is obtained for an incident angle of 70°±3°. Therefore, it is possible to obtain stably the reproduced signal having large C/N. In the present embodiment, the polarizing beam splitter 31 is formed by the parallelogram plate, but according to the invention, the polarizing beam splitter may be formed by a wedge shaped optical body in order to reduce an influence of interference at the rear surface of the optical body.

Figure 5:
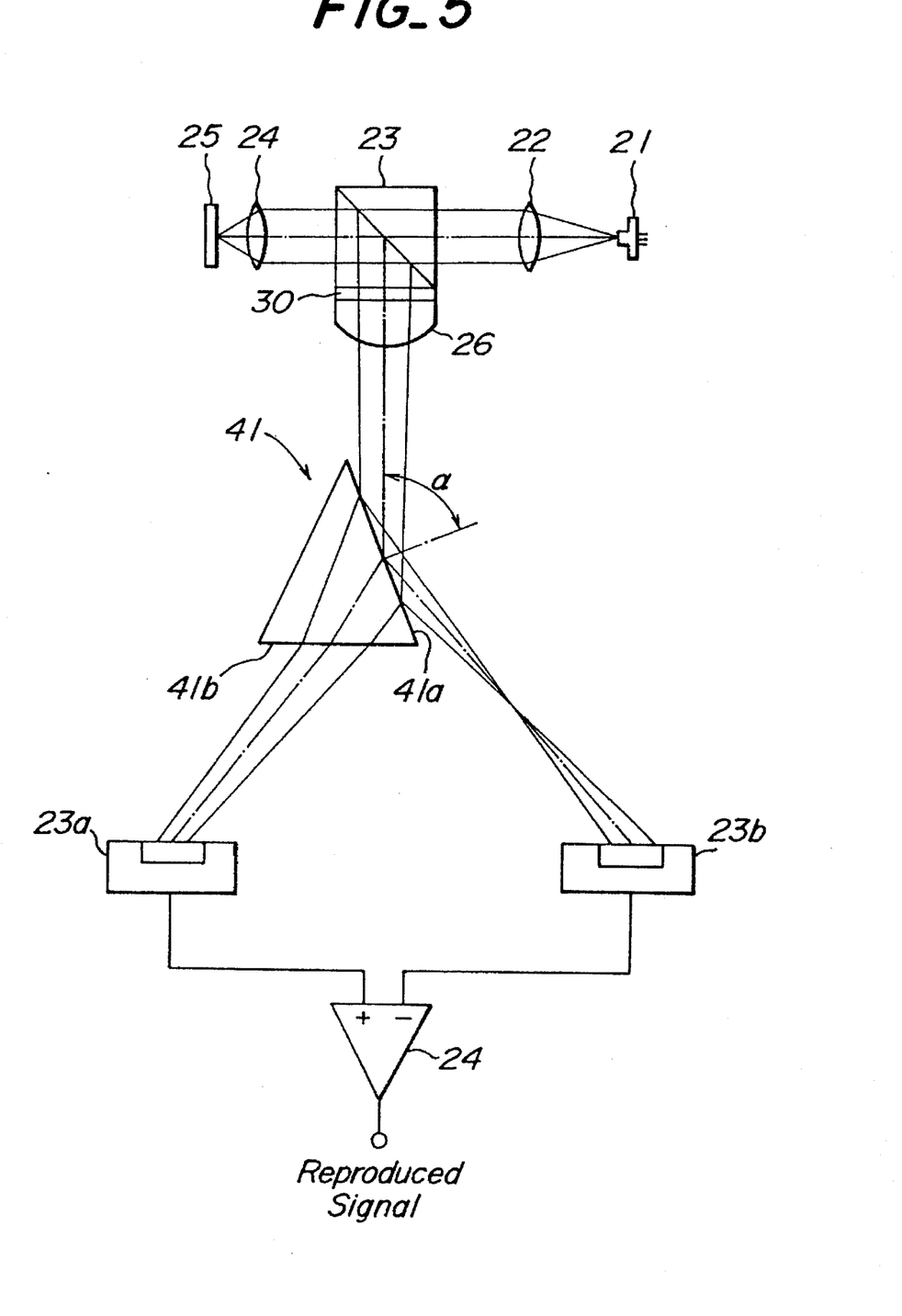
FIG. 5 shows a second embodiment of an optical pick-up head according to the present invention.

FIG. 5 is a schematic view showing a second embodiment of the optical pick-up head according to the invention. In the present embodiment, a surface polarizing beam splitter 41 is formed by a triangular prism. On an incident surface 41a of the triangular prism 41 there is provided a polarizing plane. By suitably designing the triangular prism, it is possible to introduce astigmatism, so that the focusing error may be derived by a so-called astigmatism method.

Also in the present embodiment, the polarizing beam splitter 41 cam be manufactured at a low cost. Furthermore, the triangular prism of the polarizing beam splitter 41 can afford an advantage in terms of a separation angle between the P- and S-polarized beams.

Figure 6:
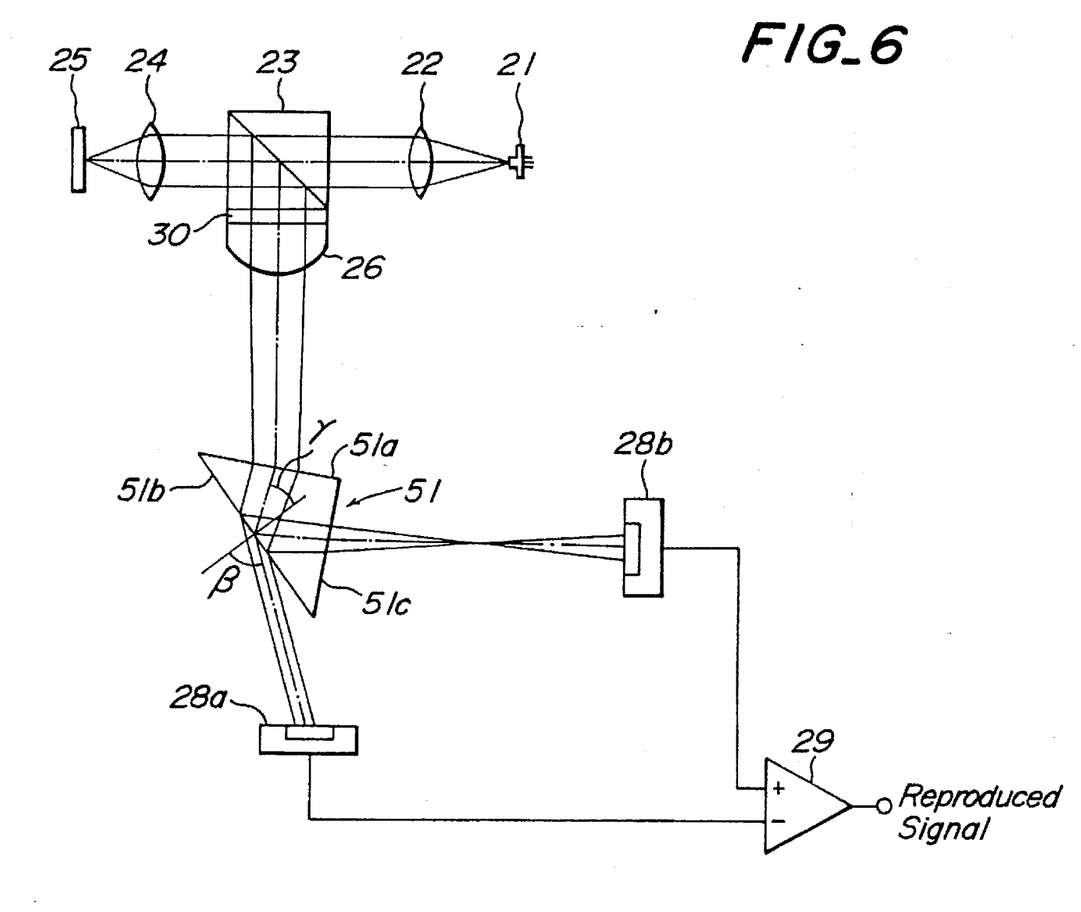
FIG. 6 shows a third embodiment of an optical pick-up head according to the present invention.

FIG. 6 is a schematic view illustrating a third embodiment of the optical pick-up head according to the invention. In this embodiment, a surface polarizing beam splitter 51 is formed by a rectangular prism having hypotenuse surface 51b and two catheti surfaces 51a and 51c, the converged light beam is made incident upon one of the catheti surfaces 51a, and a polarizing plane is formed on the hypotenuse surface 51b. A P-polarized beam is refracted by the polarizing plane, and an S-polarized beam is reflected by the polarizing plane. In this manner, the P-polarized and S-polarized beams are separated from each other by an internal reflection at the polarizing plane. In the present embodiment, an on-axis light ray is refracted by the polarizing plane by a refraction angle $\beta$ of 70°. In other words, the converged light beam is made incident upon the hypotenuse surface 51b at such an incident angle $\gamma$ that the on-axis P-polarized beam is refracted at the refraction angle of 70°. If the rectangular prism 51 is made of glass material BK7, the on-axis light ray of the converged light beam is made incident upon the hypotenuse surface 51b at an incident angle of 38.5°. Then, the on-axis P-polarized light ray is refracted by the polarizing plane at the refraction angle $\beta$ of 70°. The S-polarized beam reflected by the polarizing plane emanates from the polarizing beam splitter 51 from the other catheti surface 51c on which an anti-reflection coating is applied.

In the present embodiment, the polarizing beam splitter is formed by the rectangular prism which can be easily obtained at a low cost, so that the cost of the optical pick-up head can be further reduced. Further, the S-polarized beam is reflected by the polarizing plane into a direction which is at a right angle with respect to the incident optical axis, and thus the whole optical pick-up head can be made compact and small.

Figure 7:
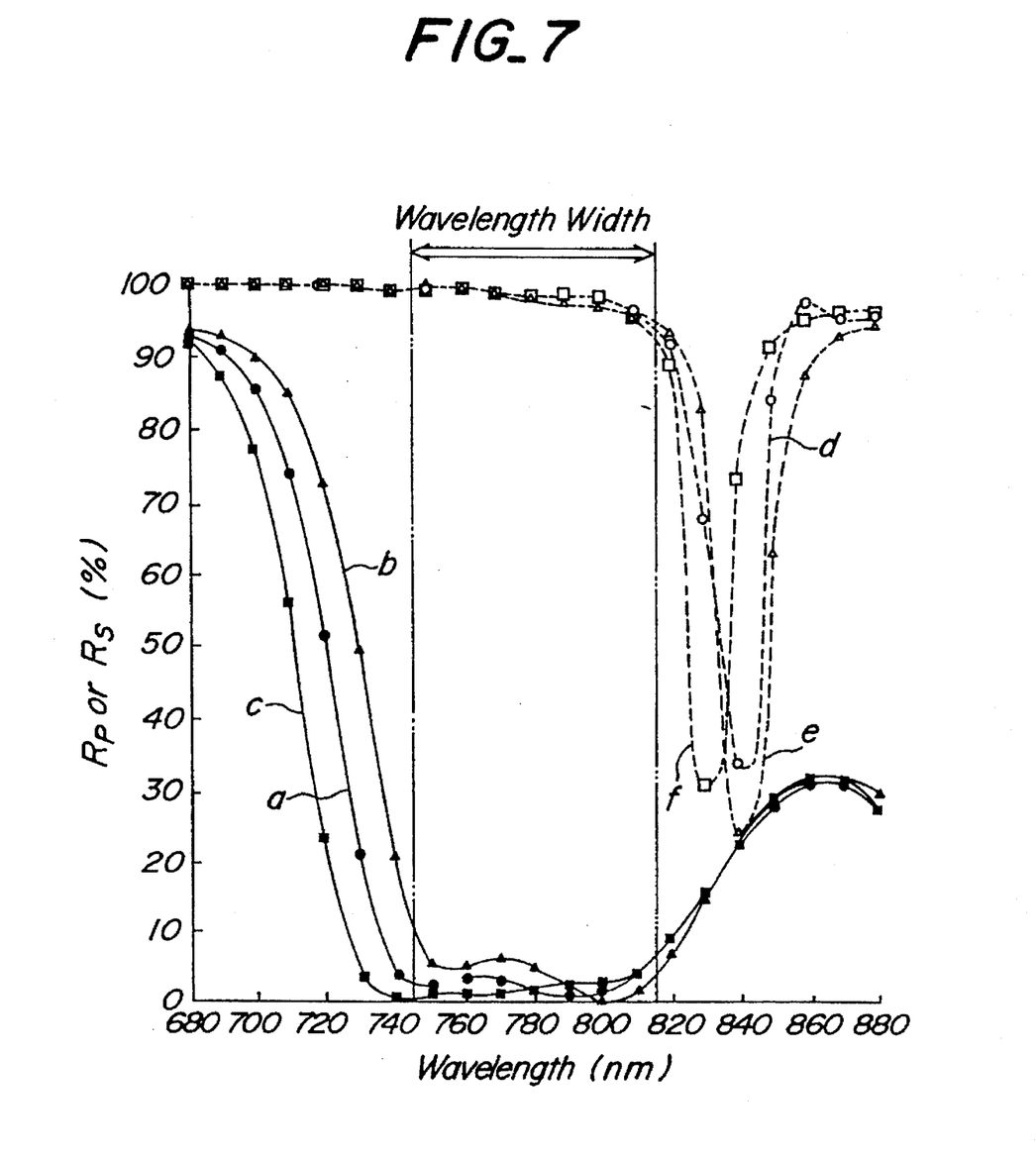
FIG. 7 shows spectrum characteristics of transmissivity and reflectance according to the present invention.

FIG. 7 is a graph showing the spectrum characteristics of the transmissivity and reflectance at an incident angle or refraction angle near 70° of the polarizing plane of the polarizing beam splitter according to the invention. A curve a represents a reflectance for the P-polarized beam at an incident angle or refraction angle of 70°, a curve b a reflectance for the P-polarized beam at an incident angle or refraction angle of 67°, a curve c a reflectance for the P-polarized beam at an incident angle or refraction angle of 73°, a curve d a reflectance for the S-polarized beam at an incident angle or refraction angle of 70°, a curve e a reflectance for the S-polarized beam at an incident angle or refraction angle of 67°, and a curve f represents a reflectance for the S-polarized beam at an incident angle or refraction angle of 73°. From these curves one can understand that more than 20 nm wavelength width for obtaining the transmissivity for the P-polarized beam and reflectance for the S-polarized beam not less than 90% can be realized by setting the incident angle or refraction angle to be 70°±3°.

The present invention is not limited to the embodiments just explained above, but many modifications and alternations may be conceived by those skilled in the art within the scope of the invention. In the above embodiments, the light source is formed by the laser light source emitting the linearly polarized beam, but according to the invention, the light source may be formed by any other light source which emits a quasi monochromatic beam. Moreover, the focusing error and tracking error may be detected by other known methods. Furthermore, in the above embodiments, the optical record medium is formed by the opto-magnetic record medium, but according to the invention, any other optical record medium such as once-write type optical record medium may be utilized.

In the optical pick-up head according to the invention, a wavelength width satisfying the practical condition for the actual optical pick-up head that the transmissivity of more than 90% for the P-polarized beam and reflectance of more than 90% for the S-polarized beam can be sufficiently wide such as 20 nm by setting the incident angle or refraction angle of on-axis light ray to 70°±3°. In the present embodiment, the polarizing plane is formed on one surface of a single optical body such as an optical plate, wedge or prism, and therefore the manufacturing step of the polarizing beam splitter can be simple and a necessary glass material can be reduced. This results in that a cost of the polarizing beam splitter can be reduced as compared with the known polarizing beam splitter with the polarizing plane formed between two prisms. Further, the polarizing beam splitter does not includes surfaces which are cemented to each other by means of a cementing agent, and thus an undesired absorption due to the chemical reaction of the coating materials with the cementing agent can be avoided, so that a very high C/N can be attained.

In the embodiment shown in FIG. 5, the polarizing beam splitter is formed by the triangular prism, and the P- and S-polarized beams can be separated at an larger separation angle, so that the whole optical pick-up head can be made small in size. In the embodiment illustrated in FIG. 6, the polarizing beam splitter is formed by the rectangular prism which can be easily obtained, and thus the cost of the polarizing beam splitter can be further reduced. Moreover, the optical axis can be bent at right angles, so that the whole optical pick-up head can be constructed compact and small.

What is claimed is:

1. An optical pick-up head comprising:

a light source for emitting an incident light beam;

a beam splitter for directing the incident light beam emitted by said light source onto an optical record medium and for directing a return light beam reflected by said optical in a direction which is different from a direction toward the light source;

a converging lens for focusing the return light beam;

a polarizing beam splitter, arranged in a path of said converged light beam, for separating said converged light beam into a P-polarized light beam having an optical axis and an S-polarized light beam; and a photodetector including first and second light receiving elements for receiving said P-polarized light beam and said S-polarized light beam, respectively; wherein said polarizing beam splitter comprises a right-angled triangular prism having an hypotenuse surface and two catheti surfaces, and a polarizing plane applied on said hypotenuse surface, and the converged light beam is made incident upon one of the two catheti surfaces, the S-polarized light beam reflected by said polarizing plane emanates from the other catheti surface, and said converged light beam is made incident upon the polarizing plane such that a refraction angle of said optical axis of the P-polarized light beam with respect to said polarizing plane is set to 70°±10°.

2. An optical pick-up head according to claim 1, wherein said first and second light receiving elements are arranged before and after a focal plane of said converging lens, and a focusing error is detected by a beam size method.

3. An optical pick head according to claim 2, wherein a tracking error is detected by a push-pull method.

4. An optical pick-up head according to claim 1, wherein said light source is formed by a laser light source emitting a linearly polarized beam as said incident light beam, and the optical pick-up head further comprises a half wavelength plate arranged between said beam splitter and said polarizing beam splitter.

5. An optical pick-up head according to claim 4, further comprising a differential amplifier, wherein output signals of said first and second light receiving elements are supplied to said differential amplifier to derive a difference signal therebetween, said difference signal representing information stored in said record medium.

6. An optical pick-up head according to claim 4, wherein said beam splitter, half wavelength plate and converging lens are formed as a single integral unit.

7. An optical pick-up head according to claim 1, wherein said polarizing plane comprises a stack of films having alternately a first refractive index and a second refractive index which is lower than said first refractive index.

* * * * *